US00RE47772E

(19) United States
(12) Reissued Patent
Diamond et al.

(10) Patent Number: US RE47,772 E
(45) Date of Reissued Patent: Dec. 17, 2019

(54) SECURE CONTENT ENABLED HARD DRIVE SYSTEM AND METHOD

(71) Applicant: NVIDIA Corporation, Santa Clara, CA (US)

(72) Inventors: Michael B. Diamond, Los Gatos, CA (US); Jonathan B. White, Fort Collins, CO (US); Piers J. Daniell, Fort Collins, CO (US)

(73) Assignee: Nvidia Corporation, Santa Clara, CA (US)

(21) Appl. No.: 14/663,402

(22) Filed: Mar. 19, 2015

Related U.S. Patent Documents

Reissue of:
(64) Patent No.: 8,402,283
Issued: Mar. 19, 2013
Appl. No.: 10/910,001
Filed: Aug. 2, 2004

(51) Int. Cl.
*G06F 21/10* (2013.01)

(52) U.S. Cl.
CPC ..... *G06F 21/10* (2013.01)

(58) Field of Classification Search
CPC ... G06F 12/1458; G06F 12/1408; G06F 12/14
USPC ..... 713/193, 192
See application file for complete search history.

(56) References Cited

U.S. PATENT DOCUMENTS 5,237,616 A * 8/1993 Abraham et al. ..... 713/193
5,552,897 A * 9/1996 Mandelbaum et al. ..... 358/400
5,623,546 A 4/1997 Hardy et al.
5,629,980 A 5/1997 Stefik et al.
5,721,829 A 2/1998 Dunn et al.
5,757,911 A * 5/1998 Shibata ..... 380/243
5,857,020 A 1/1999 Peterson, Jr.
5,861,906 A 1/1999 Dunn et al.
5,880,733 A 3/1999 Horvitz et al.
5,973,680 A 10/1999 Ueda
6,005,636 A 12/1999 Westerman
6,016,348 A 1/2000 Blatter et al.
6,028,585 A 2/2000 Ishii et al.
6,069,647 A 5/2000 Sullivan et al.
6,115,819 A * 9/2000 Anderson ..... 726/20
6,141,754 A 10/2000 Choy
6,298,445 B1 * 10/2001 Shostack et al. ..... 726/25
6,314,409 B2 11/2001 Schneck et al.
6,367,019 B1 4/2002 Ansell et al.
(Continued)

OTHER PUBLICATIONS

Matt Blaze, A Cryptographic File System for Unix, 1993, ACM, Computer and Communication Security Nov. 1993, pp. 9-16.*
(Continued)

*Primary Examiner* — B. James Peikari

(57) ABSTRACT

The present invention facilitates convenient and secure distribution of proprietary content. A present secure content enabled drive system and method permits flexible use of storage medium for both protected distribution of information and user definable storage use. In one embodiment, a computer readable storage medium includes an unprotected information portion, a protected information portion and a protection interface. The unprotected portion stores unprotected information. The protected content portion stores protected information. The protection interface protects information in the protected content portion from unauthorized access.

27 Claims, 6 Drawing Sheets

(56) References Cited

U.S. PATENT DOCUMENTS 6,389,538 B1 5/2002 Gruse et al.
6,389,541 B1 5/2002 Patterson
6,398,245 B1 6/2002 Gruse et al.
6,550,011 B1 4/2003 Sims, III
6,580,916 B1 * 6/2003 Weisshaar et al. ..... 455/456.1
6,597,380 B1 7/2003 Wang et al.
6,615,192 B1 9/2003 Tagawa et al.
6,622,148 B1 9/2003 Noble et al.
6,651,171 B1 * 11/2003 England et al. ..... 713/193
6,708,161 B2 3/2004 Tenorio et al.
6,742,116 B1 * 5/2004 Matsui et al. ..... 713/171
6,748,537 B2 * 6/2004 Hughes ..... 713/193
6,772,335 B2 8/2004 Curtis et al.
6,785,820 B1 * 8/2004 Muttik et al. ..... 726/24
6,788,800 B1 9/2004 Carr et al.
6,807,534 B1 10/2004 Erickson
6,823,451 B1 * 11/2004 Gulick et al. ..... G06F 21/85 713/153
6,832,319 B1 12/2004 Bell et al.
6,865,555 B2 3/2005 Novak
6,891,953 B1 * 5/2005 DeMello et al. ..... 380/277
6,922,740 B2 * 7/2005 Kondratiev et al. ..... 710/22
6,948,073 B2 9/2005 England et al.
6,957,343 B2 10/2005 Ripley et al.
6,980,652 B1 12/2005 Braitberg et al.
6,990,513 B2 * 1/2006 Belfiore et al. ..... 709/203
7,003,675 B2 2/2006 Benaloh
7,007,300 B1 * 2/2006 Weber et al. ..... H04K 1/00 726/21
7,010,808 B1 * 3/2006 Leung et al. ..... 726/26
7,020,688 B2 * 3/2006 Sykes, Jr. ..... 709/206
7,035,827 B2 4/2006 Ezaki
7,036,020 B2 * 4/2006 Thibadeau ..... 713/193
7,043,581 B1 * 5/2006 Gulick ..... G06F 21/71 710/104
7,047,411 B1 * 5/2006 DeMello et al. ..... 713/176
7,065,216 B1 6/2006 Benaloh et al.
7,065,506 B1 6/2006 Phillipo et al.
7,065,651 B2 * 6/2006 Evans ..... 713/189
7,069,449 B2 6/2006 Weaver, III et al.
7,073,071 B1 * 7/2006 Ellison et al. ..... 713/193
7,093,298 B2 8/2006 Rodriquez et al.
7,095,853 B2 8/2006 Morishita
7,107,462 B2 9/2006 Fransdonk
7,111,169 B2 9/2006 Ripley et al.
7,120,250 B2 10/2006 Candelore
7,120,868 B2 10/2006 Salesin et al.
7,139,811 B2 * 11/2006 Lev Ran et al. ..... 709/217
7,150,031 B1 12/2006 Rodriguez et al.
7,152,047 B1 12/2006 Nagel
7,155,733 B2 12/2006 Rodriguez et al.
7,159,120 B2 1/2007 Muratov et al.
7,181,016 B2 * 2/2007 Cross et al. ..... 380/281
7,191,153 B1 3/2007 Braitberg et al.
7,197,648 B2 * 3/2007 Evans ..... 713/189
7,200,593 B2 4/2007 Shimomura et al.
7,216,372 B2 * 5/2007 Strongin et al. ..... A47K 13/16 4/245.6
7,225,333 B2 5/2007 Peinado et al.
7,225,340 B2 5/2007 Asahi et al.
7,228,427 B2 6/2007 Fransdonk
7,242,771 B2 7/2007 Shiragami et al.
7,299,209 B2 11/2007 Collier
7,340,056 B2 3/2008 Morcel
7,353,543 B2 4/2008 Ohmori et al.
7,370,205 B2 * 5/2008 Ogino ..... 713/176
7,370,364 B2 5/2008 Dobbins et al.
7,376,624 B2 5/2008 Cochran et al.
7,383,205 B1 6/2008 Peinado et al.
7,395,333 B1 * 7/2008 Saulpaugh et al. ..... 709/225
7,395,438 B2 7/2008 Parks et al.
7,536,386 B2 * 5/2009 Samji et al.
7,543,160 B2 * 6/2009 Adams et al. ..... 713/193
7,549,044 B2 * 6/2009 Lee et al. ..... 713/167
7,606,818 B2 * 10/2009 Bachmann et al.
7,606,918 B2 * 10/2009 Holzman et al. ..... 709/229
7,607,024 B2 * 10/2009 Staring et al. ..... 713/193
7,644,446 B2 1/2010 Strom et al.
7,689,510 B2 3/2010 Lamkin et al.
7,716,746 B2 * 5/2010 Hori ..... G06F 21/10 705/59
7,933,409 B2 4/2011 Yamamoto et al.
2001/0020274 A1 9/2001 Shambroom
2001/0021926 A1 9/2001 Schneck et al.
2002/0002468 A1 1/2002 Spagna et al.
2002/0012432 A1 * 1/2002 England et al. ..... 380/231
2002/0077986 A1 6/2002 Kobata et al.
2002/0077992 A1 6/2002 Tobin
2002/0099663 A1 7/2002 Yoshino et al.
2003/0061477 A1 3/2003 Kahn et al.
2003/0097655 A1 5/2003 Novak
2003/0108199 A1 6/2003 Pinder et al.
2003/0140228 A1 * 7/2003 Binder ..... 713/172
2003/0149989 A1 8/2003 Hunter et al.
2003/0152364 A1 8/2003 Wajs
2003/0161473 A1 8/2003 Fransdonk
2003/0215091 A1 11/2003 Kambayashi et al.
2003/0225796 A1 12/2003 Matsubara
2003/0229845 A1 12/2003 Salesin et al.
2004/0015426 A1 1/2004 Tadayon et al.
2004/0083366 A1 * 4/2004 Nachenberg et al. ..... 713/170
2004/0133794 A1 7/2004 Kocher et al.
2004/0133803 A1 7/2004 Rabin et al.
2004/0148523 A1 7/2004 Lambert
2004/0193902 A1 * 9/2004 Vogler et al. ..... 713/193
2005/0008130 A1 1/2005 Wakamatsu
2005/0025312 A1 2/2005 Rijkaert et al.
2005/0058291 A1 3/2005 Candelore
2005/0086478 A1 4/2005 Peinado et al.
2005/0091511 A1 4/2005 Nave et al.
2005/0111663 A1 5/2005 Lotspiech et al.
2005/0119967 A1 6/2005 Ishiguro et al.
2005/0132179 A1 6/2005 Glaum et al.
2005/0289076 A1 12/2005 Lambert
2006/0005257 A1 1/2006 Tohru et al.
2006/0064605 A1 3/2006 Giobbi
2006/0149567 A1 7/2006 Muller et al.
2006/0190621 A1 8/2006 Kamperman et al.
2006/0224902 A1 10/2006 Bolt
2007/0033419 A1 2/2007 Kocher et al.
2007/0192111 A1 * 8/2007 Chasen ..... 705/1
2007/0208992 A1 9/2007 Koren
2008/0148063 A1 6/2008 Hanko et al.
2008/0178081 A1 * 7/2008 Reshef et al. ..... 715/700

OTHER PUBLICATIONS

Licenses for your media files are corrupted, Microsoft, Aug. 21, 2007.*

CyberLink PowerCinema Linux Featuring Instant-On Capability Enables Digital Home Entertainment for CE and PC; Press Release on Oct. 26, 2004; http://www.cyberlink.com/eng/press_room/view_747.html.*

Felten, E. W. 2003. A skeptical view of DRM and fair use. Commun. ACM 46, 4 (Apr. 2003), 56-59.*

SVP Open Content Protection System Technical Overview, SVPLA, Jan. 3, 2005, 51 pages.

Secure Video Processor Challenge-Response Protocol Top-Level Description, SVPLA, Apr. 15, 2004, 8 pages.

SearchSecurity.com, Content Scrambling System (CSS), May 2000, Retrieved from http://searchsecurity.techtarget.com/definition/Content-Scrambling-System?vgnextfmt=print.

Microsoft Corporation, "A Technical Overview of Windows Media DRM 10 for Device", pp. 1-20, Retrieved from http://download.microsoft.com/download/b/7/a/b7a9aeae-d9f2-435b-a2dc-f3b0909d1d62/ A_Technical_Overview_of_WM_DRM_10_for_Devices.doc.

USPTO U.S. Appl. No. 10/910,452, filed Aug. 2, 2004; Title: Secure content enabled drive digital rights management system and method.

USPTO U.S. Appl. No. 11/013,745, filed Dec. 15, 2004; Title: Content server and method of storing content.

(56) References Cited

OTHER PUBLICATIONS

USPTO U.S. Appl. No. 11/202,844, filed Aug. 11, 2005; Title: Method and System for Registering and Activating Content.
USPTO U.S. Appl. No. 11/014,001, filed Dec. 15, 2004; Title: Content server and method of providing content therefrom.
USPTO U.S. Appl. No. 11/112,364, filed Apr. 22, 2005; Title: Content keys for authorizing access to content.
USPTO U.S. Appl. No. 11/202,545, filed Aug. 11, 2005; Title: Method and System for Accessing Content on Demand.
USPTO U.S. Appl. No. 11/193,051, filed Jul. 29, 2005; Title: User interface for presentation of content.

* cited by examiner

"Amended"

"Amended"

"Amended"

SECURE CONTENT ENABLED HARD DRIVE SYSTEM AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates to the field of [semiconductor manufacturing. In particular, the present invention relates to a system and method for dynamically configuring operational characteristics of functional components within an integrated circuit] *secure content distribution. More particularly, some embodiments relate to a secure content enabled drive system and method that permits flexible use of a storage medium for both protected distribution of information and user definable storage area.*

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presenting information in a variety of formats (e.g., video, graphical representation of images, audio, text, etc.). The information is often proprietary and managing the distribution of proprietary information in modern electronic systems can be difficult.

Electronic systems are often utilized to present a vast variety of information for numerous different purposes. The information can be associated with a number of different activities, user experiences, presentation formats, etc. For example, electronic systems use proprietary information in the presentation of movies, music, video games, books, etc. The information can have a variety of formats and/or conform to number of different protocols. For example, information can be configured to be compatible with a variety of standards such as joint photographic expert group (JPEG) standards, moving pictures expert group (MPEG) standards, motion picture expert group audio layer 3 (MP3) standards, and/or portable document format (PDF) standards.

Digital distribution of proprietary content can be problematic. Traditional information communication and storage technologies often make copying of proprietary information relatively easy. However, developers of proprietary information usually have an economic interest in the content and desire to restrict the distribution of the information to individuals that purchase a right to access the content.

Electronic systems usually store information on a memory or storage medium. The information can be stored on a variety of storage mediums such as random access memories, hard disk drives (HDD), compact disks (CDs), digital versatile disks (DVDs), etc. The manner in which proprietary information is written and read to and from a storage medium of an end use presentation system can have significant impacts on the ability to enforce proprietary rights associated with the digital information. Traditional end use electronic systems usually have a storage medium (e.g., hard disk) that a user can readily write and read information to and from. A user typically has to load or write information to the traditional end use storage medium. Loading information onto end use hard disks can be inconvenient and problematic.

One traditional method of loading information onto an end use storage medium is to utilize a network to download the information from a remote location. Conventional network access can be inconvenient especially for portable or mobile end use platforms where reliable connections are not readily available. For example, the end use mobile platform has to be connected to a network often limiting mobility to the availability of a cable connection. Even wireless connections can have service location limitations, as some areas do not have adequate transmission and/or reception facilities. In addition, a number of technical problems can be encountered such as slow connections and/or communication interruptions. Limited bandwidth and connectivity problems can significantly impact the amount of time required to download information. Waiting for information to download can be disruptive to a user experience, especially when a user desires "instant on" presentations.

Proprietary information can be loaded on a storage medium before shipment. For example, proprietary digital content such as movies, songs etc, are usually distributed in a storage medium such as a compact disk (CD) or digital video disk (DVD). However, conventional distribution of proprietary content loaded on traditionally configured storage mediums is usually limited. For example, additional proprietary content can not typically be added to the storage medium after shipment. The amount of proprietary information stored on a particular storage medium (e.g., CD) is also often relatively limited. For example, a CD is usually limited to a relatively few songs (e.g., a limited number of songs from a particular artist) without the ability to offer an increase in proprietary content access for that CD at a later date.

SUMMARY

The present invention facilitates convenient and secure distribution of proprietary content. A present secure content enabled drive system and method permits flexible use of storage medium for both protected distribution of information and user definable storage use. A significant amount of proprietary information with regulated access can be distributed on protected portion of the storage medium while still providing storage resources for discretionary utilization by an end user. In addition to protecting information in the protected information portion, seamless and intuitive authorized interaction between information the protected content and the unprotected information is permitted. In one embodiment, a computer readable storage medium includes an unprotected portion, a protected portion and a protection interface. The unprotected information portion stores unprotected information. The protected information portion stores protected information. The protection interface protects information in the protected content portion from unauthorized access. A protection interface can provide a micro-operating system that permits authorized content presentation (e.g., video, audio, etc.) without requirement of another operating system.

In one exemplary implementation, content on the protected portion resides in an ATA-5 hard disk drive (HDD) and is restricted to access by trusted devices. The HPA area includes its own partition and encrypted file system. After successfully completing a trusted machine verification handshake process, a trusted machine is able to participate in a file system decryption process. In one embodiment, each file on a protected portion of a drive is encrypted in a special [a 2 pass] *two-pass* encryption[is utilized]. The first pass uses a real-time decryptable algorithm so it can be played back in real time. A second pass locks the file while access is unauthorized (e.g., unpaid for). Unlocked content can be protected by a variety of mechanisms. For example, after a file is unlocked it is marked and limited to being played back on trusted devices and the trusted devices have a limited number of output options as determined by the protected content.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1A:
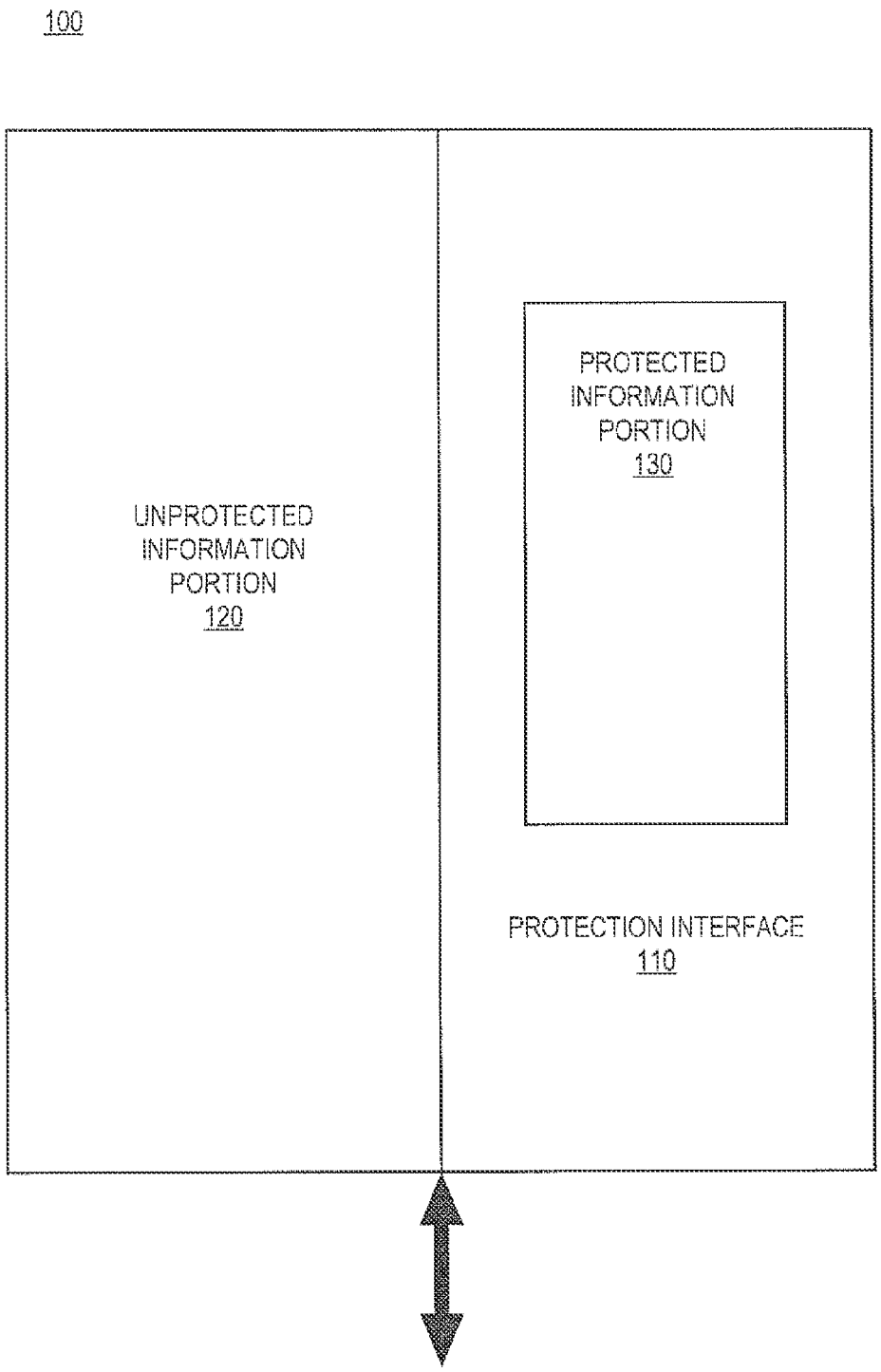
FIG. 1A is a block diagram of protected information storage medium 100 in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

FIG. 1A is a block diagram of protected information storage medium 100 in accordance with one embodiment of the present invention. Protected information storage medium 100 includes a protection interface 110, an unprotected information storage portion 120 and a protected information storage portion 130. Protection interface 110 protects information in protected information storage portion 130. For example, protection interface 110 permits authorized access to information in unprotected information storage portion 120 and prevents unauthorized access to information in protected information storage portion 130. Unprotected information storage portion 120 stores unprotected information. Protected information storage portion 130 stores protected information and access to the protected information is restricted by protection interface 110 (e.g., in accordance with a secure content enabling disk (SCED) digital rights management (DRM) protocol).

In addition to protecting information in protected information portion 130, protection interface 110 permits seamless and intuitive authorized interaction with information in the protected content and the unprotected information. In one exemplary implementation, protection interface 110 is a micro operating system or micro kernel and provides a number of operating system functions. For example, coordinating interactions between protected information storage medium 100 and an information presentation system (e.g., a computer system, a video game console, an audio system, a TV system, etc.). The protection interface 110 can also enable an "instant on" user experience in accessing the authorized information in protected information storage portion 130.

Figure 1B:
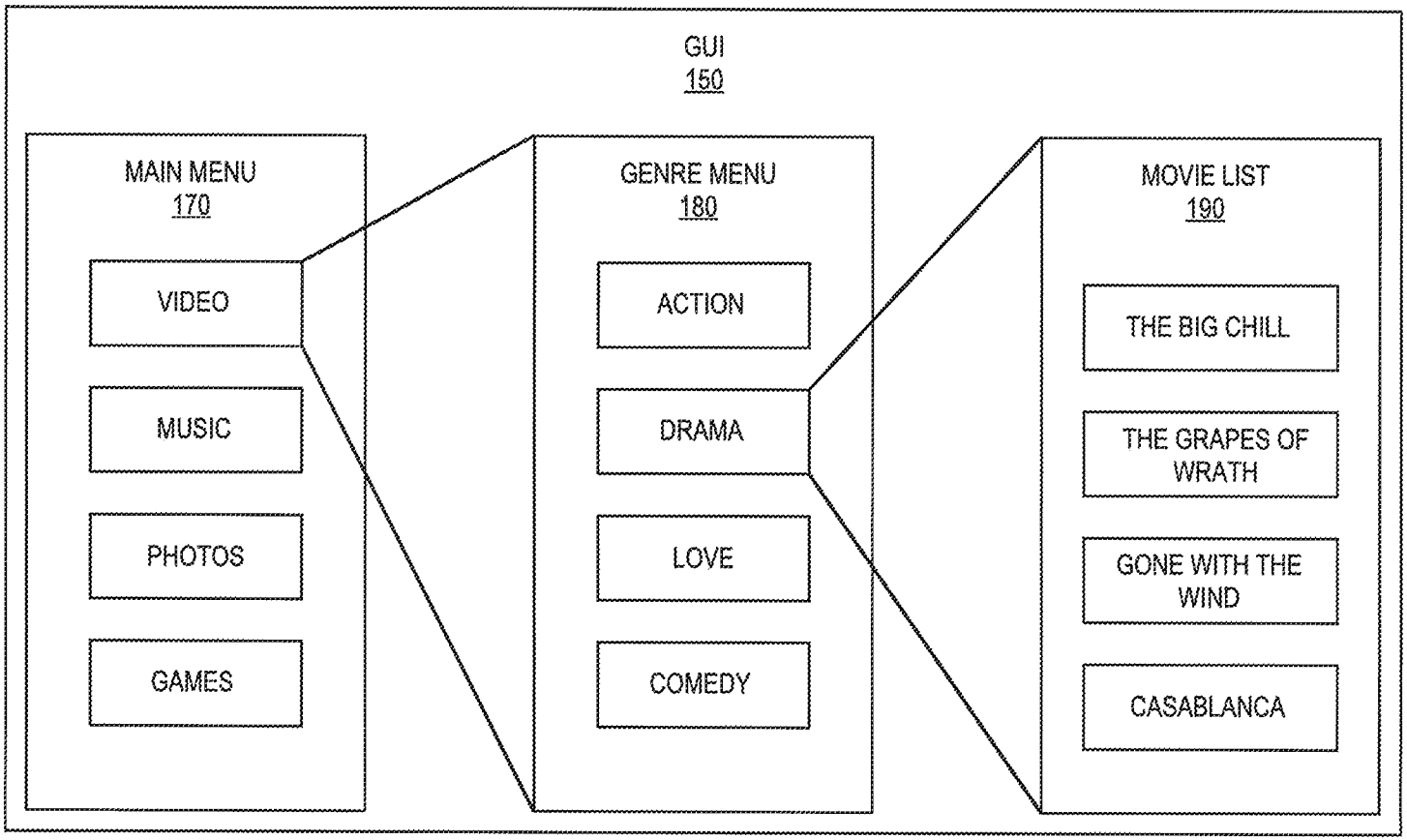
FIG. 1B is a block diagram of a unified look and feel graphical user interface (GUI) in accordance with one embodiment of the present invention.

In one embodiment, protection interface 110 also includes instructions for providing a unified look and feel graphical user interface (GUI) with content indicators (e.g., icons, drop down menus, tabs, etc.) corresponding to access authorized content stored in the protected content portion. A GUI can be organized in a convenient hierarchical architecture. FIG. 1B is a block diagram of unified look and feel graphical user interface (GUI) 150 in accordance with one embodiment of the present invention. Unified look and feel graphical user interface (GUI) 150 includes main menu 170, classification menu 180 and titles menu 190. When a user selects a tab (e.g., movies) in the main menu a classification menu pops up (e.g., genre menu 180) and when a classification tab is selected (e.g., drama) a content list pops up (e.g., movie list 190).

With reference again to FIG. 1A, in one embodiment of the present invention, protection interface 110 includes a digital rights indicator that indicates access rights to information (e.g., proprietary content) included in protected information portion 130. In one exemplary implementation, the digital rights indicator is a digital rights registry key (e.g., a sequence of digital values) that is utilized to track digital rights to the protected content. For example, the digital rights indicator can indicate that it is permissible for proprietary content included in protected information storage portion 130 to be accessed by a trusted machine (e.g., for listening and/or viewing). In one embodiment of the present invention, proprietary content (e.g., movies, music, etc.) is preloaded onto protected information storage medium 100 before shipment. For example, a large number of movies and songs are preloaded in protected information portion 130. The content is shipped with the medium, thereby eliminating the need to download the information. The protection interface 110 can also permit access rights to the protected information or content to be modified.

In one embodiment, content on the protected portion is restricted to access by trusted devices. In one exemplary implementation, a protection interface (e.g., protection interface 110) and a trusted device include information (e.g., digital keys and algorithm instructions) for participating in a trusted device verification protocol. The trusted device verification protocol is a secure handshake that is computationally very difficult to crack. The protection interface verifies device information corresponds to information associated with trusted machines. For example, each machine capable of interacting with the SCED includes a company ID, model ID, user ID, unique player ID and/or a secret SCED ID and the protection interface verifies the information corresponds to information associated with a trusted machine. Individual or models of trusted machines can be revoked by future releases of a SCED device if they are determined to be unsecure (e.g., get hacked, a Trojan is released, etc.)

In one exemplary implementation, a protected section or portion resides in an ATA-5 hard disk drive (HDD) called a host protected area (HPA). This limits the SCED to operating with machines that can unlock the HPA of the HDD with special ATA-5 commands. The HPA area includes its own partition and encrypted file system. The file-system is encrypted so that data in the protected partitioned portion is meaningless until the file-system is unlocked and decrypted. The protected portion includes algorithm instructions for decrypting the file system. After successfully completing a trusted machine verification handshake process, a trusted machine is able to participate in a file system decryption process. The file system decryption algorithm includes a handshaking process to unlock the file system. Initially ATA-5 HPA security handshaking protocol is performed followed by performance of an additional 3-way handshaking (e.g., 128 bit handshaking). The file-system includes protected content which can be encrypted at the file level (e.g., each individual file can be encrypted). It is appreciated that the present invention is not limited to ATA implementations and can be implemented on a wide variety of memory formats (e.g., SATA, flash, etc.).

In one embodiment, each file on a protected portion of a drive is encrypted in a special way. In one exemplary implementation, a 2 pass encryption is utilized. The first pass uses a real-time decryptable algorithm so it can be played back in real time. A second pass locks the file while access is unauthorized (e.g., unpaid for). A file can be designated as having a one of a variety of states at any given time. For example, a file can be designated as locked forever and can not be unlocked. A file can be designated as locked but available and can be unlocked. Alternatively a file can be designated as unlocked for everyone and a trusted machine and user can access the file (e.g., to play back). In one exemplary implementation, a file can be designated as unlocked restricted and only certain users or machines can view the content. Unlocked restricted can be restricted in a variety of ways, including by user, by machine, limited by time (e.g., content can be viewed until a certain expiration date or only at certain times), or play limited (e.g., content can only be viewed a certain number of times). If access rights to an unlocked file "expires" the file reverts back to a locked available designation or lock forever designation. In one embodiment, the file also has information about price and relock state.

After successfully participating in the file decryption processes a trusted machine can access authorized protected content. Unlocked content can be protected by a variety of mechanisms. In one embodiment, after a file is unlocked it is marked and limited to being played back on trusted device. For example, protected content access is limited to the trusted machine (e.g., designated with a certain ID) that unlocked and decrypted the content. In one embodiment, trusted devices have a limited number of output options as determined by the protected content. Restrictions on content output or presentation can be made in a variety of ways, including limiting output to Macrovision protected video output, non-digital video output or HDCP restricted digital video output, CGMS-A protection, quality (e.g., resolution, frequency, bits, etc.) limits on video and audio digital or analog, and/or watermarking requirements. For example, if a trusted machine detects a protected file has a watermark, the watermark identification or signaling can be utilized to determine whether a file is legitimately unlocked.

Figure 2:
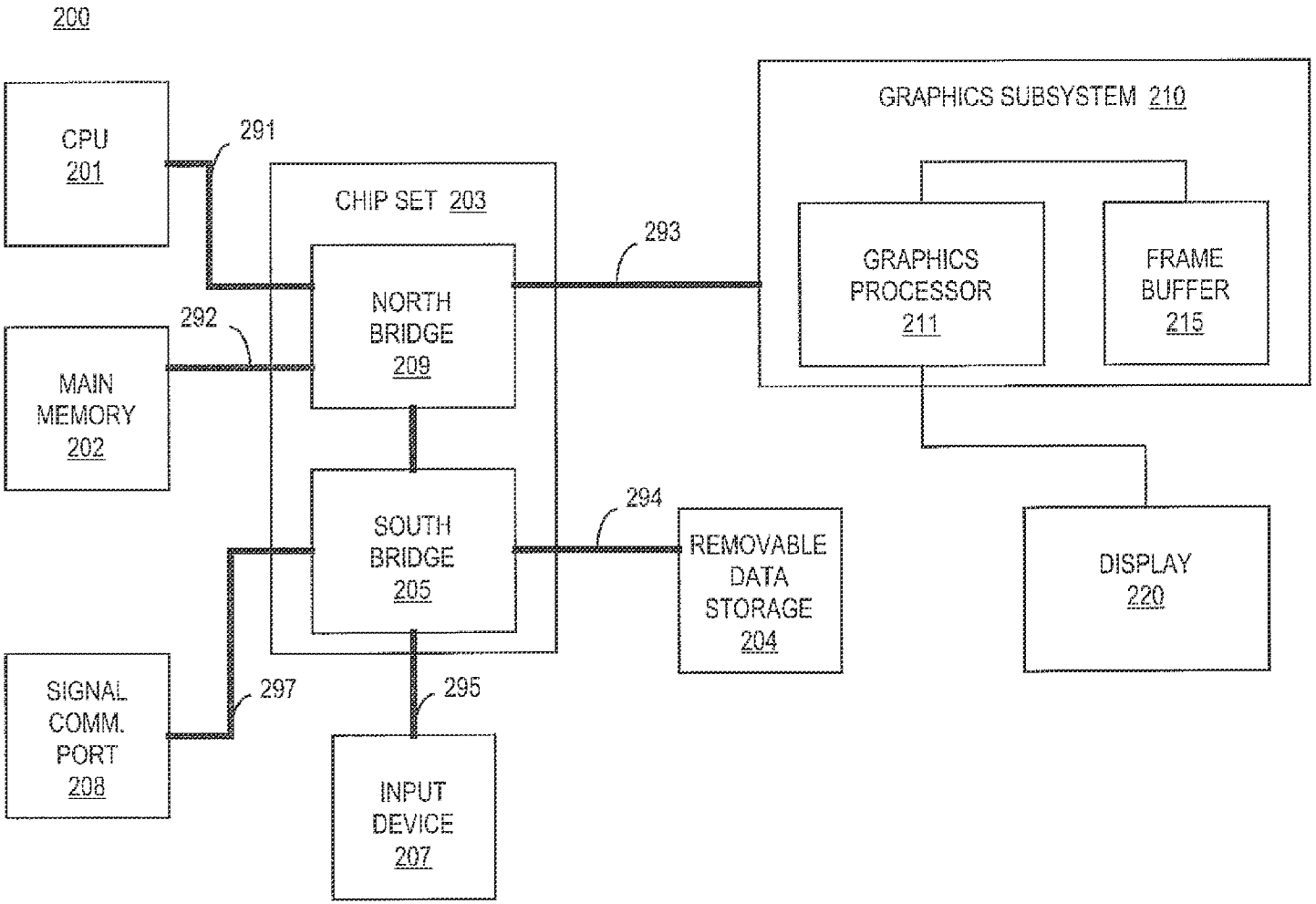
FIG. 2 is a block diagram of an exemplary computer system upon which embodiments of the present invention can be implemented.

FIG. 2 is a block diagram of a computer system 200, one embodiment of a computer system upon which embodiments of the present invention can be implemented. Computer system 200 includes central processor unit 201, main memory 202 (e.g., random access memory), chip set 203 with north bridge 209 and south bridge 205, removable protected data storage device 204 (e.g., an SCED), input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 292 (e.g., the Advanced Graphics Port interface) couples north bridge of chipset 203 to graphic subsystem 210. Communication buses 294-297 (e.g., a PCI bus) couple south bridge 205 of chip set 203 to removable data storage device 204, input device 207, signal communications port 208 respectively. Graphics subsystem 210 includes graphics processor 211 and graphics buffer 215.

The components of computer system 200 cooperatively operate to conveniently and securely provide a variety of protected content. Communications bus 291, 292, 293, 294, 295, and 297 communicate information. Central processor 201 processes information. Main memory 202 stores information and instructions for the central processor 201. Removable protected data storage device 204 is a protected information storage medium (e.g., similar to protected information storage medium 100) and stores protected information (e.g., functioning as a large reservoir of protected content). Computer system 200 is utilized to present (e.g., display) authorized information from removable protected data storage device 201. Input device [206] *207* provides a mechanism for inputting information and/or for pointing to or highlighting information on display 220. Signal communication port 208 provides a communication interface to exterior devices (e.g., an interface with a network). Display device 220 displays information in accordance with data stored in frame buffer 215. Graphics processor 211 processes graphics commands from central processor 201 and provides the resulting data to graphics buffers 215 for storage and retrieval by display monitor 220. In one embodiment, a graphics processor can present information from removable protected data storage device 204 utilizing a micro operating system of a protection interface included in removable protected data storage device 204 (e.g., without reliance on central processor or other operating system).

Figure 3:
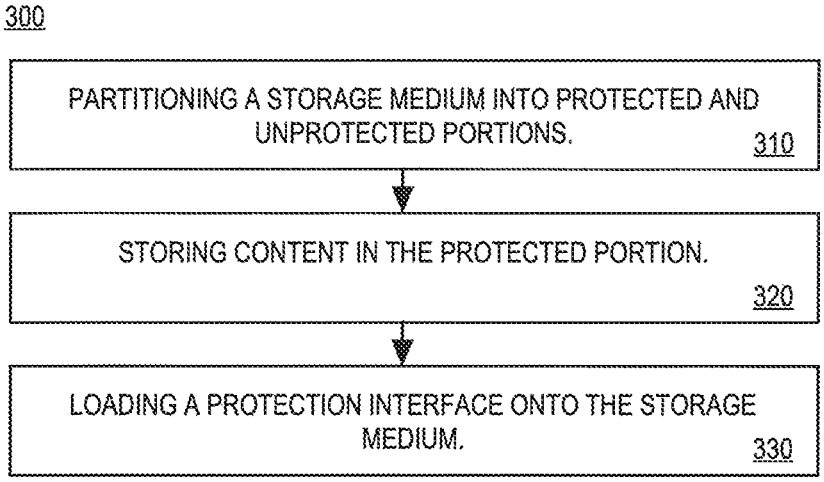
FIG. 3 is a flow chart of a content protected storage medium method in accordance with one embodiment of the present invention.

FIG. 3 is a flow chart of content protected storage medium creation method 300 in accordance with one embodiment of the present invention. Content protected storage medium creation method 300 creates a protected storage medium (e.g., a secure content enabled disk). In one embodiment, a significant amount of proprietary content is loaded on a protected portion of a secure content enabled disk. The proprietary content is protected from unauthorized access by a protection interface included in the secure content enable disk.

In step 310, a storage medium is partitioned into protected and unprotected portions. In one embodiment of the present invention, a hard disk is partitioned to reserve a percentage of available storage space for protected content and a percentage of available storage space for unprotected content. In one exemplary implementation, a portion of the storage locations are reserved for a protection interface. The portion of memory reserved for the protection interface can be a read only portion.

At step 320, content is stored in the protected portion. In one embodiment, a variety of proprietary content is stored in the protected portion. For example, movies, songs, video games and other entertainment content can be stored in the protected portion. A variety of different proprietary content can be "bundled" for convenient distribution on a single storage medium (e.g., hard disk).

In step 330, a protection interface is loaded onto the storage medium, wherein the protection interface prevents unauthorized access to the content stored in the protected portion. In one embodiment, the protected interface also provides operating system functions including memory management functions (e.g., maintains organization of files, directories, etc.), hardware interaction functions (e.g., control a disk drive, printer, etc.), and user interface functions. The protected portion interface can include instructions for providing a unified look and feel graphical user interface (GUI) with content indicators corresponding to permissible content stored in the protected content portion.

In one embodiment of the present invention, content is locked when it is loaded in the protected portion. The content can also be encrypted in the protected portion. Instructions are included in the protection interface for authorized unlocking and decrypting the content in the protected portion. In addition an unlocked file can be marked to prevent access by an untrusted machine.

Figure 4A:
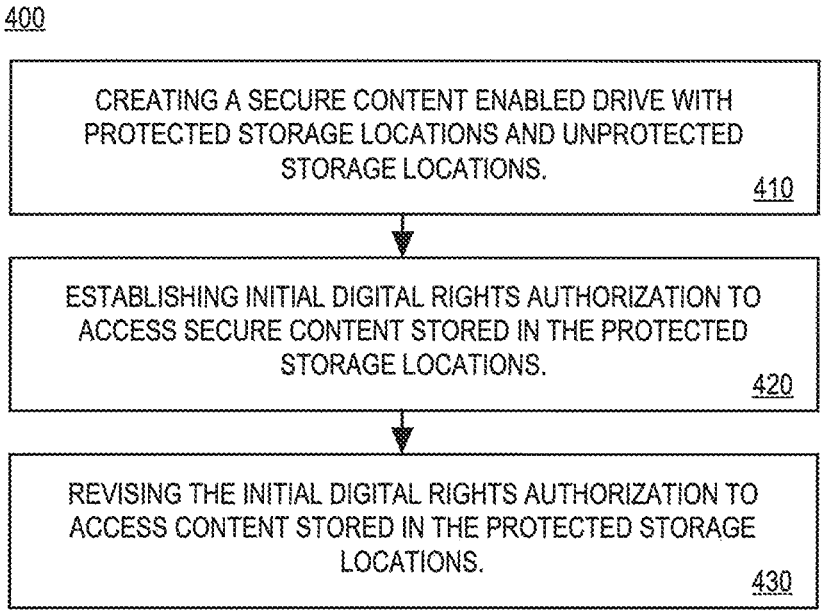
FIG. 4A is a flow chart of digital right management method in accordance with one embodiment of the present invention.

FIG. 4A is a flow chart of digital rights management method 400 in accordance with one embodiment of the present invention. Digital rights management method 400 is utilized to establish and modify digital rights to access information included in a protected portion of a protected storage medium (e.g., protected storage medium 100). For example, digital rights management method 400 can be utilized to control access to distributed proprietary content loaded on a SCED.

In step 410, a protected storage medium (e.g., a secure content enabled drive) is created with protected storage locations and unprotected storage locations. In one embodiment, creating a secure content enabled drive includes performing a content protected storage medium creation method (e.g., content protected storage medium creation method 300). For example, a storage medium is partitioned into protected and unprotected portions, proprietary content is stored in the protected portion, and a protection interface is loaded onto the storage medium. The protection interface prevents unauthorized access to the content stored in the protected portion. In one exemplary implementation, a content protected storage medium similar to content protected storage medium 100 is created.

Initial digital rights authorization to access secure content stored in the protected storage locations are established in step 420. In one embodiment, establishing initial digital rights authorization includes storing a digital rights indicator on the protected storage medium, wherein the digital rights indicator indicates digital rights to access information stored in the protected storage locations. The digital rights indicator can indicate certain files within the protected storage area are accessible via the protection interface and certain files are not accessible. In one embodiment, the secure content includes movies, songs and/or video games and a digital rights indicator indicates which movies, songs and/or video games are accessible. For example, a SCED is loaded with a variety of songs from a plurality of categories (e.g., classical music, rock and roll music, country western music, etc.) and a digital rights indicator is set to indicate a purchaser of the SCED is authorized to access a variety of songs from one category (e.g., can access classical music songs). In one exemplary implementation, the digital rights indicator is utilized in encryption and decryption of protected information (e.g., utilized as a decryption key).

In step 430, the initial digital rights authorization to access secure content stored in the protected storage locations are revised. In one embodiment, revising the initial digital rights authorization includes performing a secure content enabled drive digital rights revision process. For example, a digital rights indicator is altered to indicate a user can access a variety of songs from an additional category (e.g., a user can access both classical music songs and country western songs). In one exemplary implementation, the digital rights indicator is a registry key associated with the secure content enabled drive. The registry key can also be stored in a centralized system remote from the secure content enabled drive.

Figure 4B:
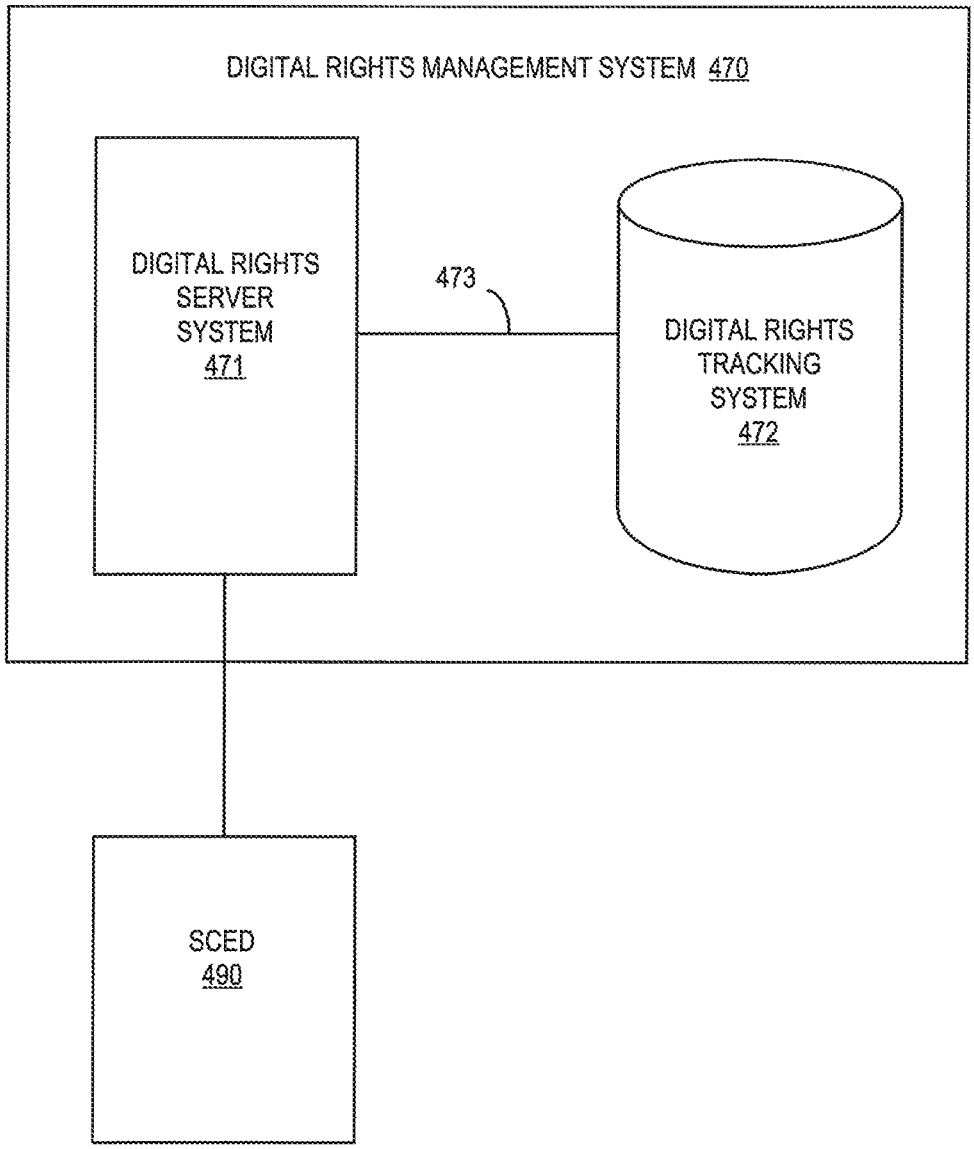
FIG. 4B is a flow chart of a digital rights management system in accordance with one embodiment of the present invention.

FIG. 4B is a flow chart of a digital rights management system 470 in accordance with one embodiment of the present invention. Digital rights management system 470 includes digital rights server 471, digital rights tracking system 472 (e.g., a database) and bus 473. Bus 473 is communicatively coupled to digital rights server 471 and digital rights tracking system 472. Digital rights management system 470 is communicatively coupled to secure content enabled drive 490. Secure content enabled drive 490 is removable and can be locally and remotely located. For example, secure content enabled drive 490 can be loaded with protected content locally with an initial digital rights setting and shipped to a remote end user and digital rights adjusted by communicating with digital rights management system 470.

The components of digital rights management system 470 cooperatively operate to track and modify digital rights. Digital rights server 471 executes instructions, including instructions for tracking and modifying digital rights to protected content on remote secure content enabled drive 490 with a protected storage portion and an unprotected storage portion. Digital rights tracking system 472 stores instructions and data, including instructions for tracking and modifying digital rights to protected content on a remote secure content enabled drive with a protected storage portion and an unprotected storage portion. Bus 473 communicates information between digital rights server 471 and digital rights tracking system 472.

In one embodiment, digital rights server 471 is utilized to establish initial digital rights authorization to access secure content stored in said protected storage locations. For example, digital rights server 471 creates an initial registry key for indicating digital rights to protected content on an SCED (e.g., SCED 490) and utilizes digital rights tracking system 472 to track the initial registry key information. In one exemplary implementation, digital rights tracking system 472 is a database and tracks digital rights indicators or keys. For example, digital rights tracking system 472 tracks the digital rights for each SCED and/or user. If a SCED is damaged or destroyed, a centralized record of SCED and user digital access rights is maintained. Digital rights server 471 is also utilized to perform a secure content enabled drive digital rights revision process to revise digital rights on an SCED (e.g., SCED 490).

Figure 5:
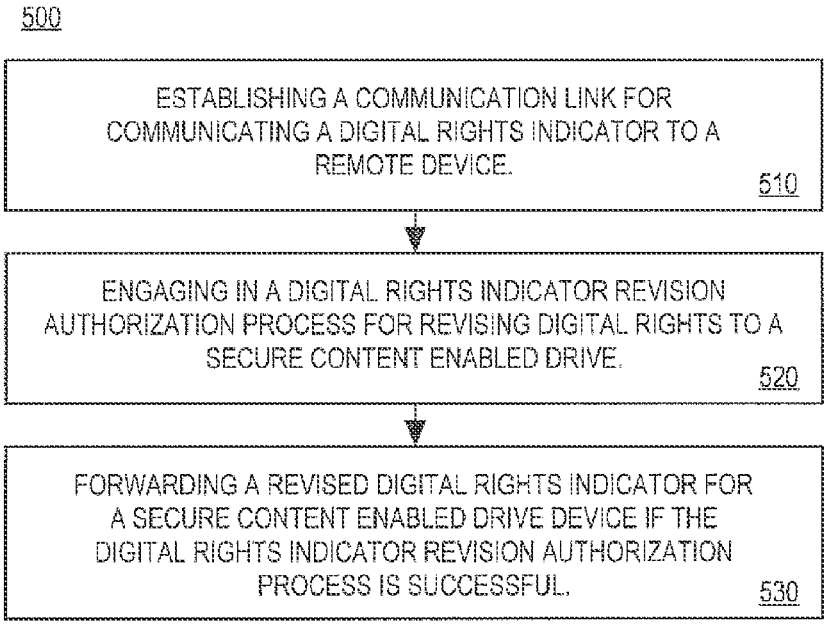
FIG. 5 is a flow chart of secure content enabled drive digital rights establishment process in accordance with one embodiment.

FIG. 5 is a flow chart of secure content enabled drive digital rights revision process 500 in accordance with one embodiment. Secure content enabled drive digital rights revision process 500 facilitates alteration of digital access rights remotely. For example, if a remote user successfully completes prerequisite authorization requirements, secure content enabled drive digital rights revision process 500 provides an updated digital rights indicator permitting access to protected information via a protection interface on a protected storage medium (e.g., a SCED).

In step 510, a communication link is established for communicating a digital rights indicator to a remote protected storage medium (e.g., SCED). In one embodiment, establishing a communication link includes receiving a request for a revised digital rights indicator. For example, a digital rights server (e.g., digital rights server 471) receives a request for a revised digital rights indicator and engages in a handshaking protocol to establish a communication link. It is appreciated that the present invention is readily adaptable for utilization with a variety of communication platforms, including wired connection and/or wireless connection. The communication link can be established on the Internet.

In step 520, a digital rights indicator revision authorization process for revising digital rights to a protected storage medium (e.g., SCED) is performed. In one embodiment, the digital rights indicator revision process includes verifying a request is from a valid requester (e.g., a trusted machine). A determination is made if the valid requester has successfully completed a digital rights purchase process. A digital rights purchase process includes receiving an indication of requested protected content access, forwarding a price for the requested protected content access and determining if the price is paid. If the valid requester has successfully completed a digital rights purchase process, a digital rights indicator (e.g., registry key) corresponding to purchased digital access rights is created.

In step 530 a revised digital rights indicator is forwarded to the protected storage medium (e.g., SCED) if the digital rights indicator revision authorization process is successful. The digital rights indicator is loaded on the protected storage medium for use in authorized access to protected content included in the protected storage medium. For example, the digital rights indicator can include a sequence of bits (e.g., binary logical values) utilized as a key in unlocking and decrypting proprietary content included in a protected information portion of a protected storage medium.

It is appreciated that the present invention can be implemented in a variety of embodiments. In one exemplary implementation the present invention can be utilized in processing systems utilized to provide a variety of graphics applications including video games. For example, the present invention can be utilized to distribute content for use in a game console, personal computer, personal digital assistant, cell phone or any number of platforms for implementing a video game. It is also appreciated that references to video game application implementations are exemplary and the present invention is not limited to these implementations.

Thus, the present invention enables secure and convenient distribution of proprietary content on flexibly usable storage medium. A significant amount of proprietary information can be distributed on a protected portion of the storage medium while regulating access to the proprietary content and still enabling storage resources for discretionary utilization by an end user. In addition to protecting information in the protected information portion, seamless and intuitive authorized interaction between information the protected content and the unprotected information is permitted. A protection interface can provide a micro-operating system that permits authorized content presentation (e.g., video, audio, etc.) without requirement of another operating system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A reprogrammable non-transitory computer readable storage medium comprising:

an unprotected portion for storage of unprotected information;

a protected information portion for storing protected information, wherein said protected information portion resides on a host protection area which is restricted to access by a trusted device, wherein said computer readable storage medium is an Advanced Technology Attachment-5 (ATA-5) hard disk drive and each file on said protected information portion of said ATA-5 hard disk drive is encrypted in a [special a two pass] *two-pass* encryption comprising:

a first pass encryption using a real-time decryptable algorithm so content can be played back in real time; and a second pass encryption which locks files while access is unauthorized; and a protection interface for protecting information in said protected information portion, wherein said protection interface engages in a trusted device verification protocol that verifies identification information is associated with said trusted device and marks unlocked protected information to prevent access by an untrusted machine, wherein said mark is forwarded with said unlocked protected information to said trusted device.

[2. A computer readable storage medium of claim 1 wherein said protection interface permits seamless and intuitive interaction between said authorized information in said protected content and said unprotected information.]

3. The computer readable storage medium of claim 1 wherein said protection interface is a micro kernel and participates in a process to unlock said protected information.

4. The computer readable storage medium of claim 1 wherein said protection interface includes instructions that direct a unified look and feel graphical user interface with content indicators corresponding to permissible content stored in said protected content portion.

5. The computer readable storage medium of claim 1 wherein said protection interface includes a digital rights registry key that is utilized to track digital rights to said protected content.

6. The computer readable storage medium of claim 1 wherein said protection portion includes its own partition and encrypted file system.

7. The computer readable storage medium of claim 1 wherein *said* protection interface includes instructions for participating in *said* trusted device verification protocol.

8. A content protected storage medium method comprising:

partitioning a reprogrammable non-transitory storage medium into a protected portion and an unprotected portion;

storing content in said protected portion wherein said protected portion resides on a host protection area which is restricted to access by a trusted device, wherein said computer readable storage medium is an Advanced Technology Attachment-5 (ATA-5) hard disk drive and each file on said protected portion of said ATA-5 hard disk drive is encrypted in a [special a two pass] *two-pass* encryption comprising:

a first pass encryption using a real-time decryptable algorithm so content can be played back in real time; and a second pass encryption which locks files while access is unauthorized; and loading a protection interface onto said storage medium, wherein said protection interface prevents unauthorized access to said content stored in said protected portion and marks an unlocked file with an indicator to prevent access by an untrusted machine, wherein said indicator is forwarded with said unlocked protected information to said trusted device.

9. A content protected storage medium method of claim 8 further comprising encrypting said content in said protected portion.

10. A content protected storage medium method of claim 8 further comprising decrypting said content in said protected portion.

11. A content protected storage medium method of claim 8 wherein said protection interface provides operating system functions including memory management functions, hardware interaction functions, and user interface functions.

12. A content protected storage medium method of claim 8 wherein said protection interface includes instructions for unlocking and decrypting said content in said protected portion.

13. A content protected storage medium method of claim 8 wherein said protected portion interface includes instructions that direct a unified look and feel graphical user interface with content indicators corresponding to permissible content stored in said protected content portion.

14. A secure content enabled disk access system comprising:

a secure content enabled disk, wherein said secure content enabled disk is partitioned into a protected portion and unprotected portion and said secure content enabled disk includes a protection interface for limiting access to proprietary content stored in said protected portion, wherein said secure content enabled disk is an Advanced Technology Attachment-5 (ATA-5) hard disk drive, wherein said protected portion stores secure content including protected information, wherein said protected portion resides on a host protection area which is restricted to access by a trusted device, wherein each file on a protected portion of said secure content enabled disk drive is encrypted in a [special a two pass] *two-pass* encryption comprising:

a first pass encryption using a real-time decryptable algorithm so content can be played back in real time; and a second pass encryption which locks files while access is unauthorized, wherein said protection interface permits authorized access to said protected content via a unified look and feel graphical user interface with content indicators corresponding to permissible content stored in said protected content portion; and a processor for executing instructions, including instructions associated with interacting with said protection interface and accessing said proprietary content.

15. A secure content enabled disk access system of claim 14 wherein access to said protected content is limited to a trusted device.

16. A secure content enabled disk access system of claim 14 wherein said protected protection interface includes instructions for performing operating system functions, including memory management functions, hardware interaction functions, and user interface functions.

17. A secure content enabled disk access system of claim 14 wherein said processor is graphics processing unit.

*18. A computer readable storage medium comprising:*

*an unprotected portion for storage of unprotected information;*

*a protected information portion for storing protected information, wherein said protected information portion resides on a host protection area which is restricted to access by a trusted device in accordance with a digital rights indicator; and*

*a protection interface for protecting information in said protected information portion, wherein said protection interface is operable to engage in a trusted device verification protocol that verifies identification information is associated with said trusted device and said protection interface is also operable to engage in a secure content enabled drive digital rights revision process, wherein said secure content enabled drive digital rights revision process comprises:*

*participating in establishing a communication link for communicating a digital rights indicator to a remote device;*

*engaging in a digital rights indicator revision authorization process for revising digital rights to a secure content enabled drive including a protected storage portion and a protection interface, wherein said protection interface is a micro kernel and prevents unauthorized read and write access to content stored in said protected storage portion; and*

*forwarding a revised digital rights indicator for said secure content enabled drive device if said digital rights indicator revision authorization process is successful.*

*19. The computer readable storage medium of claim 18 wherein said protection interface is a micro kernel and participates in a process to unlock said protected information.*

*20. The computer readable storage medium of claim 18 wherein said protection interface provides operating system functions including memory management functions, hardware interaction functions, and user interface functions.*

*21. The computer readable storage medium of claim 18 wherein said protection interface includes a digital rights registry key that is utilized to track digital rights to said protected content.*

*22. The computer readable storage medium of claim 18 wherein protection interface includes instructions for participating in trusted device verification protocol.*

*23. The computer readable storage medium of claim 18 wherein each file on a protected portion of a drive is encrypted in a two-pass encryption comprising:*

*a first pass encryption using a real-time decrypt able algorithm so content can be played back in real time; and*

*a second pass encryption which locks files while access is unauthorized.*

*24. The computer readable storage medium of claim 18 wherein said protection interface includes instructions for unlocking and decrypting said content in said protected portion.*

*25. The computer readable storage medium of claim 18, including said secure content enabled drive digital rights revision process, wherein said participating in establishing said communication link includes receiving a request for said revised digital rights indicator.*

*26. The computer readable storage medium of claim 18, including said secure content enabled drive digital rights revision process, wherein said digital rights indicator revision authorization process comprises:*

*verifying a request for said revised digital rights indicator is from a valid requester;*

*determining if said valid requester has successfully completed a digital rights purchase process; and*

*creating a registry key corresponding to purchased digital access rights if said valid requester has successfully completed a digital rights purchase process.*

*27. The computer readable storage medium of claim 26, including said secure content enabled drive digital rights revision process, wherein said valid requester is a trusted machine.*

*28. The computer readable storage medium of claim 18, including said secure content enabled drive digital rights revision process, wherein said communication link is establish on the Internet.*

* * * * *